United States Patent [19]

Bader

[11] Patent Number: 5,337,848

[45] Date of Patent: Aug. 16, 1994

[54] HYBRID DRIVE FOR A MOTOR VEHICLE

[75] Inventor: Christian Bader, Böblingen, Fed. Rep. of Germany

[73] Assignee: Mercedes-Benz AG, Stuttgart, Fed. Rep. of Germany

[21] Appl. No.: 993,595

[22] Filed: Dec. 22, 1992

[30] Foreign Application Priority Data

Jan. 25, 1992 [DE] Fed. Rep. of Germany ....... 4202083

[51] Int. Cl.$^5$ ............................................. B60K 6/02
[52] U.S. Cl. ................................. 180/65.2; 180/65.7; 477/4; 477/5
[58] Field of Search .................... 180/65.2, 65.3, 65.7, 180/65.8, 65.6, 343, 344; 74/847, 848, 866

[56] References Cited

U.S. PATENT DOCUMENTS

| | | | |
|---|---|---|---|
| 3,297,926 | 1/1967 | Campbell et al. | 180/65.8 X |
| 4,335,429 | 6/1982 | Kawakatsu | 180/65.2 X |
| 4,533,011 | 8/1985 | Heidemeyer et al. | 180/65.2 |
| 5,067,374 | 11/1991 | Sakai et al. | 74/866 |
| 5,117,931 | 6/1992 | Nishida | 180/65.2 |
| 5,195,600 | 3/1993 | Dorgan | 180/65.2 X |

FOREIGN PATENT DOCUMENTS

| | | | |
|---|---|---|---|
| 0492152 | 7/1992 | European Pat. Off. | 180/65.2 |
| 2345018 | 4/1974 | Fed. Rep. of Germany | 180/65.2 |
| 2805594 | 8/1979 | Fed. Rep. of Germany | |
| 3737192 | 7/1988 | Fed. Rep. of Germany | |
| 2943554 | 10/1990 | Fed. Rep. of Germany | |
| 4041117 | 7/1992 | Fed. Rep. of Germany | |

OTHER PUBLICATIONS

Swiss Journal: Technische Rundschau No. 46, Nov. 15, 1983, p. 9.

*Primary Examiner*—Brian L. Johnson
*Attorney, Agent, or Firm*—Evenson, McKeown, Edwards & Lenahan

[57] ABSTRACT

In a hybrid drive for a motor vehicle, a three-phase machine fed by a three-phase converter is coupled via the layshaft of the gearbox to a conventional internal-combustion engine drive train. Both the internal combustion engine and the three-phase machine can be of conventional design. In addition to the known operating modes of a hybrid drive, the three-phase machine serves as a synchronization aid for the gear change in that the layshaft is accelerated in a suitable manner during the shifting operation. As a result, the mechanical synchronization devices in the gearbox have virtually no friction work to perform and can be of correspondingly smaller dimensions.

10 Claims, 1 Drawing Sheet

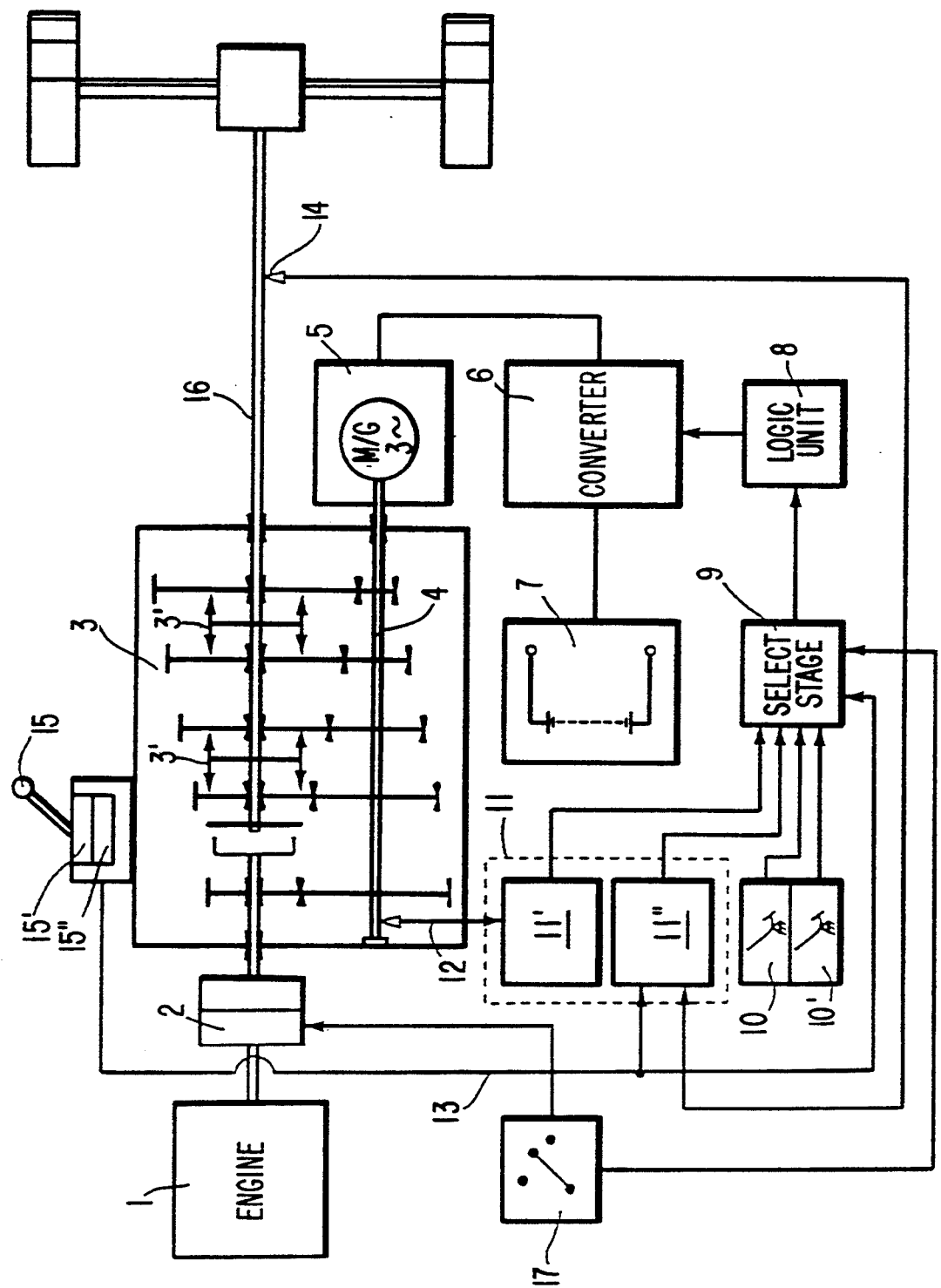

HYBRID DRIVE FOR A MOTOR VEHICLE

BACKGROUND AND SUMMARY OF THE INVENTION

The invention relates to a hybrid drive and, more particularly, to a hybrid drive for a motor vehicle, comprising an internal combustion engine which is connected via a clutch and a gearbox to a drive shaft. A three-phase machine is fed by a three-phase converter.

Hybrid drives with a comparable parallel arrangement, in which the torques of an internal combustion engine and an electrical machine are added together in the gearbox, are known from German Patent document DE 28 05 594 A1, the Swiss Journal: Technische Rundschau No. 46, 15.11.1983, page 9, and from the post-published German Patent document DE 40 41 117 A1, corresponding to European Patent Document EP 0492152. These known drives are distinguished by the fact that the conventional drive train is retained almost unaltered while eliminating the starter and the generator. The starter and generator functions are assumed by the electrical machine coupled to the gearbox, which can be used both as a generator for charging an electric energy accumulator and as a motor for driving the vehicle.

Since, in the past, commutator machines were generally provided as electrical driving machines for hybrid drive arrangements, it was necessary to ensure when designing the drive that the electrical commutator machine could be mechanically separated from the drive train when the drive was being provided exclusively by the internal combustion engine. The reasons for doing this are, on the one hand, the friction torque caused by the commutator and on the other hand, the limited life of the commutator due to mechanical wear. In such drive arrangements, the commutator machine was generally separated by means of a mechanical clutch and/or the brushes were raised from the commutator by means of an additional mechanical device. Also provided in each of the above-mentioned publications is at least one separating clutch, by which the electrical machine can be separated from the drive train.

The advance of semiconductor technology has made it possible, instead of commutator machines, to use a three-phase machine in which no electrical contact is necessary between the stator and the rotor. For example, an asynchronous machine with a squirrel cage rotor or a permanently excited synchronous machine can be used. The rotating field revolving in the air gap during operation with the motor and forming a torque is produced by a semiconductor three-phase converter. Since there is no electrical contact in such an electrical machine, the rotor can be permanently connected mechanically to the internal combustion engine driven drive train since, as long as the three-phase converter is electrically inhibited, the part exerts no reaction on the mechanical part of the drive apart from the negligible bearing friction. This idea is adopted in a different type of hybrid drive, those with serial arrangement, as described in German Patent documents DE 29 43 554 A1 and DE 37 37 192 A1. The internal combustion engine and the three-phase machine are here arranged in series on the drive train. Together with components of a first separating clutch on the internal combustion engine side and components of a second separating clutch on the gearbox side, the rotor of the three-phase machine forms a centrifugal mass which can be coupled to the internal combustion engine. A disadvantage of the serial arrangement is considered to be the fact that an extension in the axial direction between the internal combustion engine and the gearbox generally requires major structural modifications in a vehicle and therefore also requires an extremely compact design of the three-phase machine in the axial direction.

An object of the invention is based is to design a hybrid drive of the generic type in such a manner that both parts of the drive can be of essentially conventional design and that as great as possible a savings of mechanical components is achieved.

This object is achieved according to the present invention by a hybrid drive for a motor vehicle, comprising an internal combustion engine which is connected via a clutch and a gearbox to a drive shaft. A three-phase machine is fed by a three-phase converter. A rotor of the three-phase machine is coupled in a continuous, mechanical manner to a layshaft of the gearbox. The power flow between the layshaft and the three-phase machine is determined solely by the electrical controlling of the three-phase machine.

The advantages, achieved by means of the invention, over the above-mentioned prior art consist, in particular, in the fact that a second separating clutch separating the three-phase machine from the drive train is eliminated. At the same time, the structural shape of the three-phase machine is not subject to any special restrictions. If it appears necessary, it is even possible in the case of the arrangement according to the present invention to connect the three-phase machine to the layshaft via a single gear stage with fixed transmission. The rated speed of the three-phase machine can be increased in accordance with this mechanical transmission ratio, with the result that the machine becomes smaller for the same power.

It is furthermore apparent that in the case of operation where both the internal combustion engine and the three phase machine are contributing to the drive, i.e. to cover the peak load during overtaking maneuvers for example, the arrangement according to the present invention proves to be particularly advantageous since the mechanical driving torques are added in the layshaft of the gearbox. Unlike in the case of a serial arrangement, the shaft of the three-phase machine can be dimensioned merely for its own torque and can therefore be of a weaker design.

The present invention, in one embodiment, envisages a controlling of a three-phase converter in accordance with the known, prior-art rules for three-phase drives fed by current converters in vehicles. Accordingly, the three-phase machine, under the control of the accelerator pedal, can produce its rated torque or an optionally briefly permissible overload torque from standstill to the rated speed. As a further advantage there is the fact that both an electric starter motor for the internal combustion engine and a generator can be dispensed with since the function of both machines is assumed by the three-phase machine: when the mechanical gearbox is in the neutral position, the internal combustion engine can, with-the clutch between the internal combustion engine and the gearbox closed, be run up in a speed-controlled manner by the three-phase machine, directly from the traction battery via the three-phase converter. As soon as the internal combustion engine has reached the rotational speed for ignition, it is possible for the traction battery to be charged by the internal combustion engine simply by switching over the power flow in the three-phase converter.

Further embodiments of the present invention are described by means of which gearbox shift operations are assisted by the three-phase machine. Thus, during a gear change, the controlling of the three-phase machine can be influenced in a manner such that the mechanical synchronization means which are intended to achieve, in a mechanical way by frictional engagement, the synchronism of the gear pairs to be coupled in the gear box, have virtually no frictional work to perform since the torque for decelerating the transmission parts when shifting to a higher gear stage and for accelerating the transmission parts when shifting to a lower gear stage is provided by the three-phase machine. On the one hand, it is thereby possible to improve the gearbox shift operations by shortening the unwanted interruption in the tractive effort and, on the other hand, it is even possible to conceive of a reduction in the dimensions of the mechanical synchronization means relieved by the electric synchronization aid or, in the case of a further embodiment, of dispensing with these completely. In both cases, the mechanical outlay in the gearbox is reduced.

Other objects, advantages and novel features of the present invention will become apparent from the following detailed description of the invention when considered in conjunction with the accompanying drawings.

BRIEF DESCRIPTION OF THE DRAWING

The sole figure is a schematic block diagram relating to a hybrid drive of the present invention.

DETAILED DESCRIPTION OF THE DRAWING

A hybrid drive in the configuration proposed is depicted in a schematic block diagram in the sole figure. An internal combustion engine 1 is connected in the customary manner, via a clutch 2 designed as a starting and shifting clutch, to the input shaft of a gearbox 3. The clutch 2 can be actuated in a known manner by the driver or by the switching stage 17, which switching stage 17 serves for the preselection of the driving mode. The gearbox 3 has a lay shaft 4 which, on the one hand, drives the gear pairs provided for the individual gear stages and, on the other hand, is connected to a three-phase machine 5, either directly or via a transmission stage (not shown) with a fixed transmission ratio. The gear pairs of the gearbox 3 are positively coupled to a drive shaft 16 in a conventional manner via the indicated sliding sleeves 3', which are actuated by a mechanical gear selection lever 15.

A three-phase machine 5, the depicted three-phase design of which is only to be taken as an example, is connected via a three-phase converter 6 to a traction battery 7. The three-phase converter 6 is controlled by a drive logic unit 8 which, on the basis of the setpoint input by a setpoint selection stage 9, produces the control signals necessary for controlling the semiconductor switches to produce a suitable rotating field in the three-phase machine 5. The setpoint selection stage 9 receives a setpoint input from an accelerator pedal 10 and a brake pedal 10', both of which are actuated by the driver and, in addition, act in a known manner (not shown) on the drivetrain of the internal combustion engine. To assist a gear change, it is also possible to provide for the setpoint selection stage 9 to be switched to the setpoint input of a synchronization stage 11 with the clutch 2 disengaged and during a gear change. This can be designed either as an inertia-torque compensation unit 11' or as a rotational speed matching unit 11". The switchover of the setpoint selection stage 9 to the setpoint input of the synchronization stage 11 and back to the setpoint input of the accelerator and brake pedals (10, 10') is triggered by a gear shift signal 13 from the gear shift sensor 15' which detects whether a gear has been nonpositively engaged or not.

In a first illustrative embodiment, the setpoint input of the synchronization stage 11 in its configuration as an inertia-torque compensation unit 11' ensures that, with the clutch 2 disengaged, the rapid positive or negative acceleration of the lay shaft 4 initiated in the gearbox 3 in the case of a gear change is assisted by the three-phase machine 5, the torque output of the three-phase machine 5 corresponding in its absolute value to the acceleration torque $|J*dn/dt|$. Here, J is the known inertia torque of the centrifugal mass formed by the rotor of the three-phase machine 5 and the parts of the gearbox 3 which are firmly connected to it and dn/dt is the change in the rotational speed of the lay shaft 4, which is measured by a rotational speed sensor 12 and is fed to the inertia torque compensation unit 11'. In this manner, the three phase machine 5 compensates the inertia torques acting upon acceleration of the lay shaft 4 during the gear change.

In a second illustrative embodiment, the setpoint input of the synchronization stage 11 in the configuration as a rotational-speed matching unit 11" ensures that, with the clutch 2 disengaged, the rotational speed of the lay shaft 4 after the shift operation has been completed is calculated from the instantaneously prevailing rotational speed of the drive shaft 16. The rotational speed is measured by means of a rotational speed sensor 14 and the intended gear change, which is for example, detected by means of position sensor 15" in each slot of the gear change lever 15. This rotational speed value is output as a setpoint value to the setpoint selection stage 9. Since, with the clutch 2 disengaged and the gear not engaged, the lay shaft 4 can be both accelerated and decelerated with the full driving torque by the three-phase machine 5, the lay shaft 4 will rapidly reach the rotational speed required after the gear change, the synchronism of the gear pairs to be coupled in the gearbox 3 thus being established. The setpoint input by means of the stage for rotational speed matching 11" requires a higher outlay since the gear-shift signal 13 must not only indicate a gear change, but this signal must additionally indicate which gear the driver intends to engage.

The various operating modes of the hybrid drive 5 are as follows. By means of the switching stage 17, for example via a shift lever, the driver first of all determines whether the drive is to be accomplished solely by means of the internal combustion engine, solely by means of the electrical machine or as a hybrid drive. By means of this preselection, it is also possible, via the setpoint selection stage 9, to influence the power distribution between the internal combustion engine and the electrical machine.

If the vehicle is to be driven exclusively by the internal combustion engine 1, the stationary internal combustion engine is started in the neutral position of the gearbox 3, with the clutch 2 engaged. The engine is started by the three phase machine 5 by the traction battery 7, via the three phase converter 6 by means of a contact (not shown) of the ignition switch, which acts on the control logic unit 8. The power flow through the three-phase converter 6 is then inhibited. After the engagement of a gear, the vehicle can be moved away by the driver in the customary manner using the clutch 2. Further upshift operations are assisted by the three-phase machine in the manner already described, by the setpoint input of the inertia-torque compensation unit 11' or by the rotational-speed matching unit 11", depending on the embodiment In the case of braking operations of the vehicle, these being signalled by the setpoint input, actuated by the driver, of the brake pedal 10', the three-phase machine 5 is driven into the operating condition of a generator by the three-phase converter 6 and the traction battery 7 is charged accordingly. It is thereby possible to achieve an effect similar to that of a retarder (hydromechanical brake), the various gear stages of the gearbox 3 advantageously ensuring that the braking power exerted is constant over a relatively wide speed range.

In purely an electric mode, the clutch 2, having been switched by a signal from the switching stage, is continuously disengaged. It is possible to accomplish this by means of a servomotor. Starting is effected with a gear stage engaged while at a standstill, by means of the setpoint input actuated by the driver via the accelerator pedal 10 and of the corresponding controlling of the three-phase converter 6. To change the gear stage, the three-phase converter 6 is inhibited or, in a further development, controlled by the synchronization stage 11.

In the electric mode of operation and with the vehicle in motion, it is possible by switching over the switching stage 17 to change to the hybrid driving mode, thereby making it possible for the clutch 2 to be engaged and the internal combustion engine 1 to be started, which engine then contributes to driving the vehicle. It can likewise be seen immediately from the preceding description that the electric part of the drive can be connected up at any time and hence the hybrid driving mode achieved, even in the operating mode in which only the internal combustion engine is being used. It is possible in a known manner to change continuously between operating the three-phase machine 5 as a motor and as a generator by means of the control logic unit 8.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A hybrid drive for a motor vehicle, comprising:
    an internal combustion engine connected via a clutch and a gearbox to a drive shaft, said gearbox including a layshaft drivingly connected to the driveshaft,
    a three-phase machine with electrical power supply thereto via a three-phase converter,
    and a continuous mechanical connection between a rotor of the three-phase machine and the layshaft providing a common axis for both the rotor and the layshaft,
    whereby power flow between the three-phase machine and said layshaft is solely determined by electrical control of the three-phase machine via the three-phase converter.

2. A hybrid drive according to claim 1, wherein a traction battery is connected to the three-phase machine via the three-phase converter, said three-phase converter being controlled by a control logic unit which receives a setpoint input from an accelerator pedal and a brake pedal via a setpoint selection stage.

3. A hybrid drive according to claim 2, wherein, with said clutch disengaged, the three-phase machine serves as a synchronization aid by following the setpoint input of an electronic synchronization stage and accelerating or decelerating the lay shaft during a gear change.

4. A hybrid drive according to claim 3, wherein the setpoint selection stage receives from a gear shift sensor a gear shift signal which brings about a switchover between the setpoint input of the accelerator and brake pedals and the setpoint input of the synchronization stage.

5. A hybrid drive according to claim 3, wherein the synchronization stage includes a control device for inertia-torque compensation which, with the aid of a rotational speed sensor, receives the change in the rotational speed of the lay shaft as an input and outputs a setpoint input calculated therefrom.

6. A hybrid drive according to claim 4, wherein the synchronization stage includes a control device for inertia-torque compensation which, with the aid of a rotational speed sensor, receives the change in the rotational speed of the lay shaft as an input and outputs a setpoint input calculated therefrom.

7. A hybrid drive according to claim 3, wherein the synchronization stage is designed as a control device for rotational-speed matching which as an input receives the rotational speed of the drive shaft and the gear which is to be engaged and outputs a setpoint input calculated therefrom.

8. A hybrid drive according to claim 4, wherein the synchronization stage is designed as a control device for rotational-speed matching which as an input receives the rotational speed of the drive shaft and the gear which is to be engaged and outputs a setpoint input calculated therefrom.

9. A hybrid drive according to claim 7, wherein position sensors in a gear shift lever sense which gear is to be engaged and output a corresponding signal.

10. A hybrid drive according to claim 8, wherein position sensors in a gear shift lever sense which gear is to be engaged and output a corresponding signal.

* * * * *